United States Patent [19]

Loizeau

[11] Patent Number: 4,537,298
[45] Date of Patent: Aug. 27, 1985

[54] TORSIONAL DAMPERS

[75] Inventor: Pierre Loizeau, Ville d'Avray, France

[73] Assignee: Valeo, Paris, France

[21] Appl. No.: 464,933

[22] Filed: Feb. 8, 1983

[30] Foreign Application Priority Data

Feb. 9, 1982 [FR] France ............... 82 02033

[51] Int. Cl.³ ........................... F16D 3/66; F16D 3/68
[52] U.S. Cl. .................... 192/106.2; 192/106.1; 464/68; 464/85
[58] Field of Search ............... 192/70.17, 106.1, 106.2; 464/66, 68, 83, 85

[56] References Cited

U.S. PATENT DOCUMENTS 2,964,930 12/1960 Aira et al. .

FOREIGN PATENT DOCUMENTS 1213399 10/1959 France .
1329923 5/1963 France ........................... 192/106.2
1537961 7/1968 France .
2371609 11/1976 France ........................... 192/106.2
2371608 11/1976 France ........................... 192/106.2

*Primary Examiner*—Rodney H. Bonck
*Attorney, Agent, or Firm*—Charles A. Brown; Charles E. Brown

[57] ABSTRACT

A torsional damper comprises two parts (A, B) mounted to rotate relative to one another. Disposed between them in the circumferential sense are springs (10', 10") each partially housed with circumferential clearance in an opening (27', 27") in one part (A) and partially housed without circumferential clearance in an opening (28', 28") in the other part (B). With each of the springs (10') with which is associated the lower or lowest circumferential clearance there is associated an elastic material peg (30T, 30R) projecting from the spring and mounted slidably in a bush (32). Between it and this bush (32) are constricting means. The torsional damper finds particular application in clutch mechanisms for automotive vehicles.

12 Claims, 7 Drawing Figures

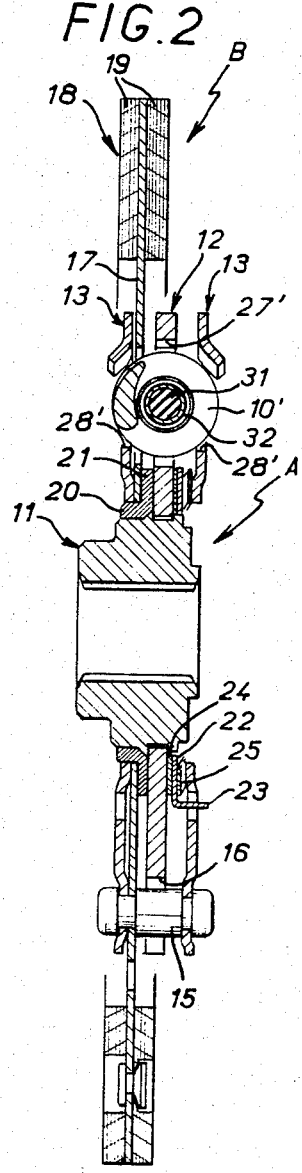
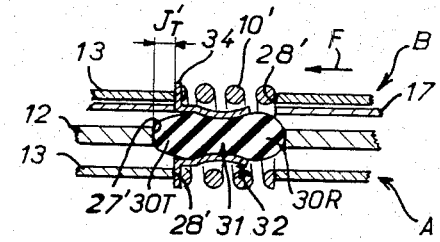
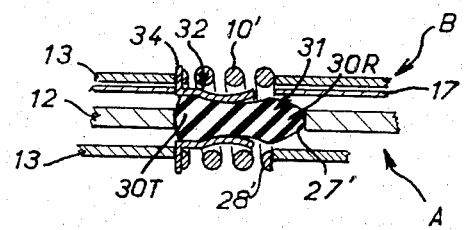
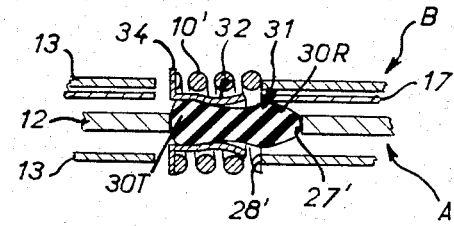
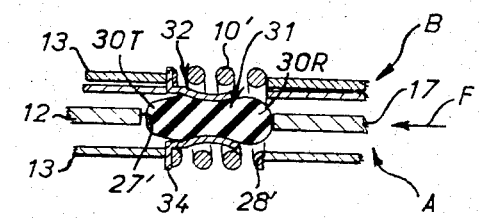
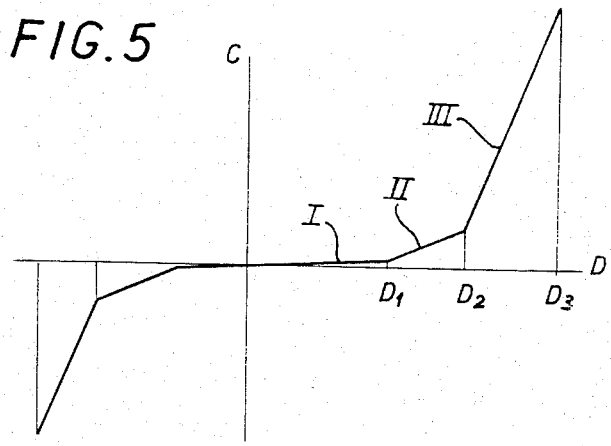

TORSIONAL DAMPERS

BACKGROUND OF THE INVENTION

1. Field of the Invention

The present invention is generally concerned with torsional damper devices comprising two coaxial parts mounted to rotate relative to one another within a defined range of relative angular movement against circumferentially acting elastic means.

2. Description of the Prior Art

As is known, this type of torsional damper device is normally incorporated in the design of a friction clutch, particularly for automotive vehicles, for example, in which case one coaxial part carries a friction disk designed to rotate with a first shaft, in practice a driving shaft and the motor output shaft in the case of an automotive vehicle, constituting a part referred to hereinafter for convenience as the driving part, whereas the other of said coaxial parts is carried on a hub designed to rotate with a second shaft, in practice a driven shaft and the gearbox input shaft in the case of an automotive vehicle, constituting a part referred to hereinafter for convenience as the driven part.

This type of torsional damper device is used to permit regulated transmission of rotational torque applied to one of its coaxial parts where the other is itself subject to a rotational torque, in other words, to filter vibrations which may arise at any point in the kinematic system in which it is incorporated, extending from the motor to the axles in the case of an automotive vehicle.

The present invention is more particularly directed towards the case in which the elastic means used in such a torsional damper device, disposed between the coaxial parts constituting same, comprise a plurality of helical springs extending in a substantially tangential direction relative to a circumference of the damper assembly and disposed between said coaxial parts in the circumferential direction, each of said springs being housed partially in an opening formed for this purpose in the driving part and partially in an opening also formed for this purpose in the driven part.

In practice, it is common practice to divide the springs used into at least two separate groups and to delay the action of at least one of these groups during relative angular movement between the driving and driven parts, in order to modulate the stiffness of the elastic means operative between the driving and driven parts according to the extent of relative angular movement between them and thus to improve the adaptation of the assembly to the specific filtering effect required.

To this end, whereas, in the rest configuration of the damper, all springs used are usually disposed without circumferential clearance in the corresponding openings in the driving part, those whose action is to be delayed are, in this rest configuration, disposed with circumferential clearance in the corresponding openings in the driven part, so that they are operative only from the time at which, by virtue of the relative angular movement between the driving and driven parts, this circumferential clearance is absorbed.

As a corollary to this, at the start of such relative angular movement, the only springs which act are those which, in the rest configuration of the damper, are disposed without circumferential clearance in the corresponding openings in the driven part and in the corresponding openings in the driving part.

In practice, these springs are of relatively less stiffness than those acting jointly with them subsequently.

More often than not, these springs of relatively low stiffness, which together form a first or low-stiffness damper stage, the other springs also used together forming a second or high-stiffness damper stage, are disposed in openings in the driving part and in the driven part separate from those in which said other springs are disposed.

This results in an increase in the number of openings required in the driving and driven parts, the disadvantage of which is two-fold.

On the one hand, for a given final stiffness, the degree of mechanical weakening of the driving and driven parts due to the openings formed in them increases with the number of openings and may become excessive, whereas, on the other hand, with a given and acceptable number of openings in the driving and driven parts, the resulting final stiffness may be insufficient for the torque to be transmitted between said parts.

To overcome this problem, it has already been proposed, notably in French Pat. No. 1 537 961 dated July 21, 1967, to dispose within the relatively stiffer springs the relatively less stiff springs intended to act first, so that the latter benefit from the openings formed in the driving and driven parts for the relatively stiffer springs, by having them project in the circumferential direction beyond the latter so that they come into action before them.

Although this arrangement has given and can still give satisfaction, it leads in practice to structures which are relatively complex and expensive.

In particular, in a case such as the present one where one of the coaxial parts comprises a disk and the other comprises two guide rings parallel thereto, in which the openings for the springs are formed, it is necessary, in order to counterbalance the effect of centrifugal force on the springs of relatively less stiffness and to ensure their correct retention in position, to reinforce the guide rings by means of disks and backing disks, and to extend the openings in these in the circumferential direction by means of a notch at one circumferential end, for insertion of the corresponding end of the springs of relatively lower stiffness.

The result is an increase in the overall axial dimension of the damper, and mechanical weakening of the parts in which said notches are formed. This also applies to the disk when no reinforcing disk or backing disk is used, these notches then being formed in the disk.

In all cases, by their very nature, the springs of relatively lower stiffness employed in this way do not permit other than linear change in the torque transmitted between the coaxial parts as relative angular movement between them progresses.

A general objective of the present invention is to provide an arrangement which can overcome these disadvantages and which, by not requiring the use of complex retaining means, is relatively simple and economic, while ensuring effective filtering of vibration and opening up a new field of application of the torsional damper devices concerned.

SUMMARY OF THE INVENTION

The present invention consists in a torsional damper comprising at least two coaxial parts mounted so as to be rotatable relative to one another within pre-determined limits of relative angular movement, a plurality of helical springs extending in a substantially tangential direction relative to a circumference of the damper and disposed between said coaxial parts in the circumferential direction, each of said springs being partially housed, without circumferential clearance in a rest configuration of the damper, in an opening formed for this purpose in a first of said coaxial parts, and partially housed, with circumferential clearance in said rest configuration, in an opening formed for this purpose in a second of said coaxial parts, a peg of elastic material disposed inside at least one of said helical springs and projecting from it in at least a first circumferential direction, a bush coaxial with said spring and in which said peg is slidable in the circumferential direction, keyed to said first part in the circumferential direction opposite to said first circumferential direction, and constricting means disposed between said elastic material peg and saisd bush to impede movement of said peg within said bush and to return said peg to a substantially central rest position after such movement.

Thus, for the circumferential direction of interest, no spring acts at the start of relative angular movement between the coaxial parts concerned, only the elastic material peg or pegs provided in accordance with the invention then acting, and yielding elastically in the circumferential direction by virtue both of their inherent elasticity and their movement within the respective bush when acted on by one of said parts, such movement being impeded by the associated constricting means.

By this arrangement, the elastic material peg or pegs fulfill the function of relatively low stiffness helical springs, without requiring the relatively complex means usually necessary for retaining such helical springs in position.

Also, they open up a new field of possibilities to the torsional damper devices concerned.

First of all, they offer advantages over and are more convenient than helical springs with regard to provision for both circumferential directions for a given helical spring.

In practice, for one of the helical springs at least, there is actually provided a respective elastic material peg for each circumferential direction, and the elastic material pegs thus associated with a given spring are integral with one another, together constituting an elastic material core.

This results in beneficial simplification of the damper assembly.

In this case, the constricting means between an elastic material peg and the bush in which it is slidably mounted may, with great simplicity, consist in the fact that the core of which the elastic material peg forms part is generally diabolo-shaped, the associated bush, shared by the two elastic material pegs which this core forms, then having, in its central area, a shape complementary to that of the core.

As a result, no special arrangement is required to maintain in position the free end of an elastic material peg, since this extends freely of its own accord and cantilever fashion from the area in which it is gripped by the associated bush.

Specifically, no retaining notch is required in any component of the coaxial parts concerned, which is beneficial to the mechanical strength thereof, and no reinforcing disk or backing disk is required, which minimizes the overall axial dimension of the damper assembly.

More generally, the use in accordance with the invention of elastic material pegs to constitute elastic means of relatively lower stiffness which must act alone at the start of relative angular movement between the coaxial parts concerned, and the accommodation of these elastic material pegs within the springs of relatively higher stiffness, provides the benefit of either permitting said coaxial parts to be formed with the minimum number of openings therein for the elastic means to be disposed between them, or releasing space for the use of supplementary elastic means.

Moreover, under idling conditions, that is to say with values of torque between the coaxial parts concerned sufficiently low for the helical springs not to be called upon to act, the elastic material pegs in accordance with the invention, on each driving pulse between said coaxial parts, are first driven and compressed and then subject to reverse movement, impeded by the associated constricting means, notably during the decreasing positive part of such a driving pulse, and, by virtue of these constricting means, then return of their own accord to their central rest position during the negative part of the driving pulse, before a further driving pulse.

This favors the required damping action.

Also, by conferring a suitable profile on the free end of the elastic pegs and/or by conferring an appropriate configuration on the associated constricting means, it is possible with advantage to modulate at will the changing torque transmitted between the coaxial parts concerned during the course of relative angular movement between them, and in particular to dispense with mere linear change in this torque, where required and for at least one circumferential direction, it being understood moreover that the torque may change differently for each of the circumferential directions.

Finally, by not requiring notches in any of the component parts of the torsional damper device concerned, or the use of any other form of retaining means, the arrangement in accordance with the invention may be readily and with advantage applied to a torsional damper device of conventional design without significant modification thereto.

Other objects and advantages will appear from the following description of an example of the invention, when considered in connection with the accompanying drawings, and the novel features will be particularly pointed out in the appended claims.

BRIEF DESCRIPTION OF THE DRAWINGS

FIG. 2 is a view in axial cross-section on the line II—II in FIG. 2.

FIG. 3 is a partial view of the device in circumferential cross-section on the line III—III in FIG. 1, in plane development.

FIGS. 4A, 4B and 4C are views analogous to that of FIG. 3 and showing the mode of operation of the torsional damper device in accordance with the invention.

FIG. 5 is a diagram representing this operation.

DESCRIPTION OF THE PREFERRED EMBODIMENT

Figure 1:
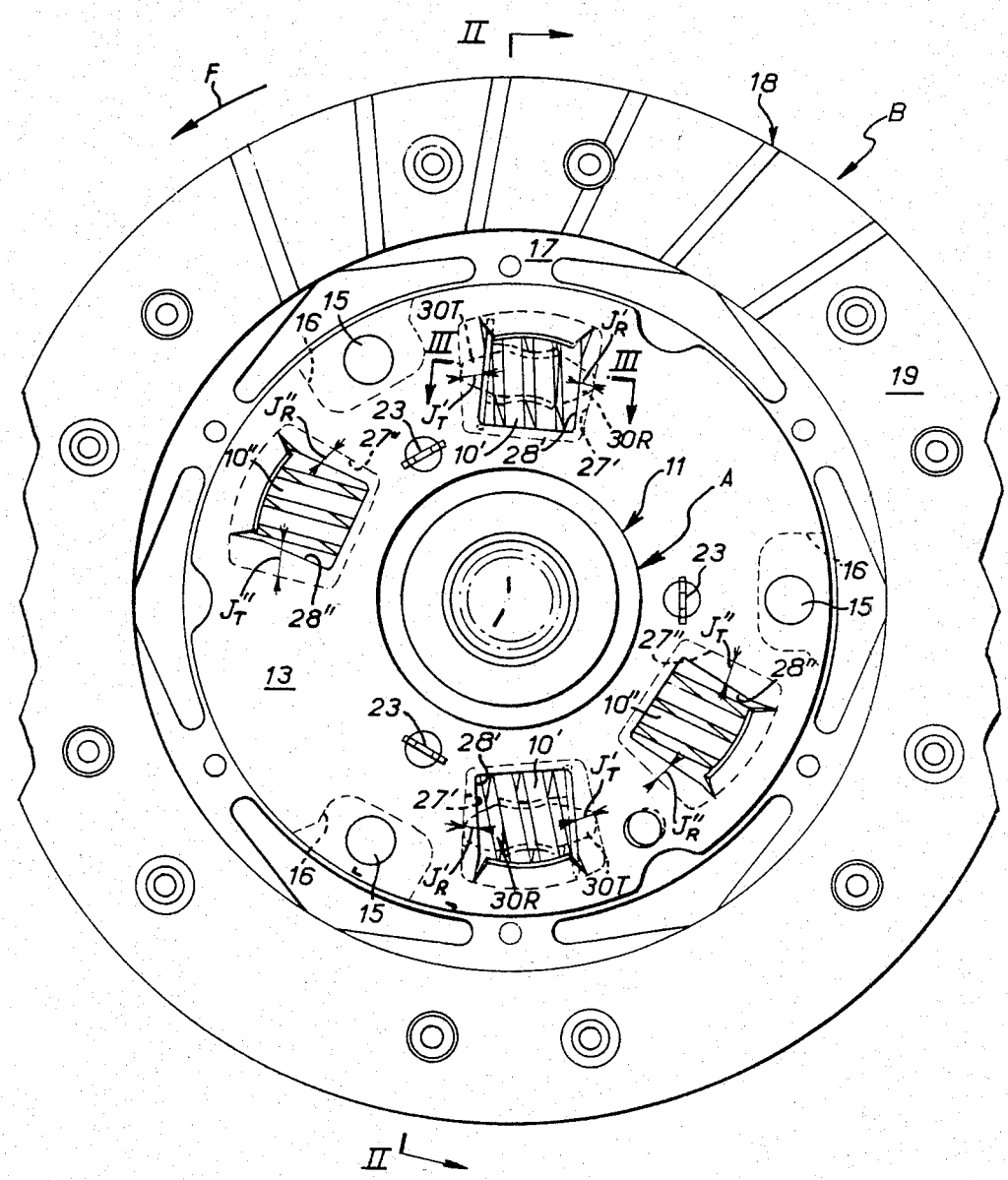
FIG. 1 is a partial view in elevation of a torsional damper device in accordance with the invention.

As shown in these Figures, which illustrate by way of example the application of the invention to the construction of a damper hub type friction clutch for automotive vehicles, the torsional damper device in accordance with the invention comprises, in a general manner known per se, two coaxial parts A and B mounted so as to be rotatable relative to one another within predetermined limits of relative angular movement, and a plurality of helical springs, to be described in detail hereinafter, disposed circumferentially between said coaxial parts A and B and extending in a substantially tangential direction relative to a circumference of the damper, the same circumference for all springs in the embodiment shown.

Part A, hereinafter referred to for convenience as the "driven" part, comprises, in the embodiment shown, a hub 11 designed to be keyed to rotate with a shaft, in practice a driven shaft, by means of internal splines, for example, as shown here. It further comprises a hub disk 12 which is rigidly attached to hub 11, being crimped to the latter, for example, as shown here.

Part B, hereinafter referred to for convenience as the "driving" part, comprises, in the embodimwent shown, two guide rings 13 disposed on respective opposite sides of hub disk 12, parallel thereto and spaced therefrom. They are rigidly attached together by means of spacers 15 which pass with clearance through notches 16 formed for this purpose in the periphery of disk 12.

The driving part B also comprises a friction disk assembly 18 attached by its disk 17 to one of guide rings 13, on the side thereof facing the other guide ring 13, by the same spacers 15 which also attach it to said other guide ring 13. This friction disk assembly is intended to be gripped axially, by means of its friction facings 19, between two plates keyed against rotation to a shaft, in practice a driving shaft.

On the side of hub disk 12 facing friction disk assembly 18 there is disposed, between the corresponding guide ring 13 and disk 17 of friction disk assembly 18, on the one hand, and hub 11 of the driven part, on the other hand, a bearing 20 attached to which is a radial collar 21 inserted axially between disk 17 of friction disk assembly 18 and hub disk 12.

On the side of hub disk 12 facing the other guide ring 13 are axially inserted, on the one hand, an action ring 22 which is keyed to rotate with guide ring 13 by axial lugs 23 and carries a friction facing 24 in contact with hub disk 12 and, on the other hand, between action ring 22 and guide ring 13, an axially elastic ring 25 of the kind, for example and as shown here, marketed under the commercial designation "ONDUFLEX".

These arrangements are well known per se and, as they do not constitute part of the present invention, will not be described in further detail here.

Also in a manner known per se, the springs disposed circumferentially between the driven part A and the driving part B are divided, in the embodiment shown, into two separate groups of springs 10', 10''.

In the embodiment shown, thwere are two springs 10', disposed in substantially diametrically opposite relationship to one another.

Likewise, in this embodiment, there are also two springs 10'', disposed in substantially diametrically opposite relationship to one another, alternating with the preceding springs.

Each of springs 10', 10'' is partially housed in an opening 27', 27'' formed for this purpose in driven part A, in practice an opening formed in hub disk 12 of the latter, and partially in openings 28', 28'' also formed for this purpose in driving part B, in practice openings formed in guide rings 13 of the latter and in disk 17 of friction disk assembly 18.

In the embodiment shown, in the idle configuration of the damper, as shown in FIG. 1, all springs 10', 10'' are disposed without circumferential clearance in openings 28', 28'' in driving part B.

Likewise, in this embodiment and for at least one circumferential direction, springs 10', 10'' are all disposed with circumferential clearance in openings 27', 27'' in driven part A in the idle configuration of the damper.

In the embodiment shown, there is circumferential clearance for both circumferential directions.

For example, in the case of the circumferential direction represented by an arrow F in FIG. 1, assumed to be the more frequent rotation direction of the damper for forward movement of the vehicle concerned, and corresponding to operation of the damper with increasing torque, this circumferential clearance, as measured in the angular direction, has a value $J'_T$ for springs 10' and a value $J''_T$ for springs 10''. For the opposite circumferential direction, corresponding to operation of the damper with decreasing torque, it has a value $J'_R$ for springs 10' and a value $J''_R$ for springs 10''.

In practice, the values of circumferential clearance $J'_T$ and $J''_T$ with increasing torque are respectively greater than the values of circumferential clearance $J'_R$ and $J''_R$ with decreasing torque, and the values of circumferential clearance $J'_T$ and $J'_R$ associated with springs 10' are respectively less than the corresponding values $J''_T$ and $J''_R$ associated with springs 10''.

Naturally other arrangements are feasible, in particular equality of the values $J'_T J'_R$ and $J''_T J''_R$, for example.

In accordance with the invention, there is associated with at least one of springs 10', 10'' and for at least one circumferential direction (in other words, for at least one direction of relative rotation of parts A and B) a peg 30T, 30R of elastic material, an elastomer material, for example, disposed inside the spring and projecting beyond it in the circumferential direction in question.

In the embodiment shown, there are only pegs 30T, 30R associated with springs 10' to which correspond the lower or lowest values of circumferential clearance $J'_T$, $J'_R$ for the idle configuration of the damper, and, for each of springs 10', there is provided a respective peg 30T, 30R for each circumferential direction, namely a peg 30T for the direction corresponding to operation of the damper with increasing torque, as shown by the arrow F in FIG. 1, and a peg 30R for the opposite direction, corresponding to operation of the damper with decreasing torque.

In practice, in the embodiment shown, pegs 30T, 30R thus associated with the same spring 10' are integral with one another and together constitute a core 31 of elastic material.

In accordance with the invention, each of pegs 30T, 30R is mounted to slide in the circumferential direction in a bush 32, common to them both in the embodiment shown since they jointly constitute the aforementioned core 31 of elastic material.

Bush 12 is coaxial with corresponding spring 10' and is keyed to driving part B in the circumferential direction opposite to the circumferential direction in question.

Finally, in accordance with the invention, constricting means are implemented between each of elastic material pegs 30T, 30R and bush 32, to impede their movement within the latter and to return them to a central rest position after such movement.

In practice, in the embodiment shown, elastic material pegs 30T, 30R forming parts of the same elastic material core 31, the associated constricting means consist in core 31 being generally diaboloshaped, thus having an area of reduced diameter between pegs 30T, 30R which it forms, and bush 32 in which it is disposed has conjointly, in its central area, a complementary form.

Thus bush 32 is venturi-shaped, with divergent and convergent sections linked to one another by a central area of reduced diameter.

In practice, the reduced diameter area linking together elastic material pegs 30T, 30R of a given core 31 has a rounded profile in cross-section, as does the corresponding central area of the associated bush 32. With regard to both bush 32 and core 31, the cone angle or the angle of the tangent to the divergent section after this reduced diameter area may be equal to that for the convergent section preceding said reduced diameter area, or different thereto, according to the effect required with changing values of the torque transmitted between the coaxial parts in question during relative angular movement between them.

Similarly, this cone angle may be different for bush 32 and core 31, at least in one circumferential direction.

In practice, core 31 is longer than bush 32, with the result that elastic material pegs 30T, 30R which constitute it project beyond bush 32 in the rest configuration of the damper. Bush 32 is of sufficiently small length not to project beyond spring 10' within which it is disposed when the latter is compressed.

For preference, and as shown, elastic material pegs 30T, 30R may be tapered, at their free end at least, and not necessarily the same at both ends. On the contrary, the tapered configuration of the two elastic material pegs 30T, 30R of the same core 31 may advantageously be different, for better adaptation to actual operating conditions, as will be further explained hereinafter.

In the embodiment shown, with regard to elastic material peg 30T corresponding to operation of the damper with increasing torque, bush 32 is keyed in the circumferential direction to driving part B by means of the corresponding spring 10'.

It has, at its circumferential end corresponding to elastic material peg 30T, a radially projecting flange 34 which is disposed in the circumferential direction between the corresponding circumferential end of the spring 10' concerned and the corresponding circumferential edge of opening 28' in driving part B in which spring 10' is disposed. In this context, "circumferential edge" means an edge encountered in moving along a circumference rather than an edge extending in the circumferential direction.

It will be obvious that, in the case of elastic material peg 30R corresponding to operation of the damper with decreasing torque, bush 32 is directly keyed in the circumferential direction by its flange 34 to driving part B, flange 34 bearing directly, for the circumferential direction opposite to the circumferential direction in question, on the corresponding circumferential edge of opening 28' in driving part B in which the corresponding spring 10' is disposed.

In the embodiment shown, and in the idle configuration of the damper (FIG. 3), the free end of elastic material peg 30T is in contact with the corresponding circumferential edge of opening 27' in driven part A in which is disposed the spring 10' in question.

The same applies to elastic material peg 30R in this embodiment.

OPERATION

For the rotation direction shown by the arrow F in FIGS. 1 and 3 and for operation of the damper with increasing torque, torque is applied to driving part B and what happens is exactly as if driving part B were moving in the direction of arrow F relative to driven part A.

During a first stage of operation, only elastic material pegs 30T deform elastically and immediately, on the one hand because each of these elastic material pegs 30T has a stiffness which is significantly less than that of the associated spring 10', and on the other hand because, due to the action of driven part A against which its free end bears, it is constrained to slide in bush 32 in which it is engaged, in the circumferential direction opposite to that marked by arrow F.

Because of the constricting means between it and bush 32, it resists its engagement within the latter, this resistance increasing with such engagement, whereas, with regard to elastic material peg 30R, there may be conjointly developed increasing annular clearance between this elastic material peg 30R and bush 32.

In the graph shown in FIG. 5, the relative angular movement D between driving part B and driven part A is plotted on the abscissae against the torque C transmitted from one of these parts to the other, plotted along the ordinates. On this graph, this first stage of operation is represented by a curve I, the slope of which is proportional to the stiffness of elastic material pegs 30T.

To simplify the diagram in FIG. 5, this curve has been shown as a straight line.

However, due to the tapered configuration of the free ends of elastic material pegs 30T on the one hand and the configuration of the associated constricting means on the other hand, the stiffness of elastic material pegs 30T increases with relative angular movement D.

By suitably choosing these configurations, it is thus possible to obtain a particular trend in curve I and thus a pre-determined change in the torque C as a function of the relative angular movement D.

It will be assumed firstly hereinafter that the torque between coaxial parts A and B increases sufficiently for this first stage of operation to continue until, for a value D1 of relative angular movement D, the clearance $J'_T$ associated with springs 10' is absorbed (FIG. 4a).

These springs 10' then come into action (FIG. 4b), their effect being added to that of elastic material pegs 30T which, although no longer operative, remain compressed. In the diagram in FIG. 5, this second stage of operation is represented by curve II, the slope of which is proportional to the combined stiffness.

This second angle of operation continues until, for a value D2 of relative angular movement D, the clearance $J''_T$ associated with springs 10'' is in its turn absorbed.

Springs 10'' then come into action, their effect being added to that of springs 10' and that of elastic material pegs 30T, which remain compressed. In the diagram in FIG. 5, this third stage of operation is represented by a straight line III, the slope of which is proportional to the combined stiffness.

This third stage of operation itself ends when, for a value D3 of relative angular movement D, driven part A is directly driven by driving part B, either because at least some of springs 10', 10'' then have their turns contiguous or because spacers 15 are then in contact with the corresponding circumferential edge of notches 16 of hub disk 12 through which they pass.

For operation of the damper with decreasing torque, the torque between parts A and B is reversed and a process similar to the preceding process occurs.

What happens is then as if driven part A were in its turn moving in the circumferential direction marked by arrow F relative to driving part B (FIG. 4C).

During such retrograde movement of driven part A, assuming that this commences from the above specified value D3 of relative angular movement D, springs 10" firstly then springs 10' and finally elastic material pegs 30T expand.

While, in the usual manner, springs 10' and springs 10" then move with driven part A as they expand, this is not necessarily the case with elastic material pegs 30T.

While, by virtue of the constricting means between them and bushes 32 in which they are engaged, these elastic material pegs 30T return of their own accord to the central rest position, the conditions are preferably such that, by design, this return to the rest position of elastic material pegs 30T is delayed relative to the corresponding movement of driven part A.

In other words, and as shown in FIG. 4C, clearance J then appears between the free end of elastic material pegs 30T and the corresponding circumferential edge of openings 27' in driven part A in which they are disposed, such that elastic material pegs 30T advantageously exert no untimely thrust on driven part A.

Conjointly, part of the torque transmitted between driving part B and driven part A is advantageously absorbed by friction between cores 31 of which elastic material pegs 30T form part and bushes 32 in which these cores 31 slide.

The foregoing relates only to that portion of the retrograde movement of driven part A prior to its return to a central position.

Beyond this position, elastic material pegs 30R come into action, then springs 10', then springs 10", the process being analogous to that described hereinabove for operation with increasing torque.

It will be assumed now that, with the motor of the vehicle concerned idling, the torque between coaxial parts A and B remains sufficiently low at all times for springs 10' (and a fortiori springs 10") to be ineffective.

As is well known, in the usual case of an internal combustion motor, driving force is applied cyclically to driving part B for transmission to driven part A and features in succession a positive part, first increasing then decreasing, and a negative part, first decreasing then increasing, but less accentuated than the preceding positive part.

During the increasing positive part of a driving pulse, elastic material pegs 30T, each driven by the corresponding bush 32, are subject to circumferential compression, because of the constricting means associated with them, whereas there appears a clearance between elastic material pegs 30R and the corresponding edge of opening 27' in hub disk 12 in which each is disposed.

Then, for a given torque, and particularly during the decreasing positive part of the driving pulse, they begin rearward movement relative to the corresponding bush 32.

This reverse movement, which is impeded by the associated constricting means, continues during the negative part of the driving pulse, whereas elastic material pegs 30R are then subject to circumferential compression, in a similar manner to the preceding compression of elastic material pegs 30T, but to a lesser degree, in view of the less accentuated character of this negative part of the driving pulse.

It is, moreover, to take account of this difference between the positive and negative parts of a driving pulse that the configuration of elastic material pegs 30R is preferably different to that of elastic material pegs 30T.

Be this as it may, these elastic material pegs are preferably constructed to return to their initial rest position before a further driving pulse occurs so that, as previously, clearance appears between the free end of these elastic material pegs and the corresponding circumferential edge of the openings in the driven part in which they are disposed, part of the torque then transmitted between the driving part and the driven part being advantageously absorbed by friction between the cores of which these elastic material pegs form part and the bushes in which these cores slide.

In the foregoing, for reasons of simplification, no account has been taken of the well known hysteresis phenomenon which, due to friction between parts A and B, results in a difference between the value of the torque transmitted between these parts for increasing relative angular movement between them and the torque transmitted between these parts for decreasing relative angular movement.

It will be understood that various changes in the details, materials and arrangements of parts, which have been herein described and illustrated in order to explain the nature of the invention, may be made by those skilled in the art within the principle and scope of the invention as expressed in the appended claims.

For example, an elastic material peg might be associated with one only of the springs, that to which corresponds, in the idle configuration of the damper, the lower or lowest configuration clearance, and/or a pweg of this kind might be provided for one circumferential direction only.

In practice, an elastic material peg may on the contrary be associated with each of the springs used, in one or both directions.

When two circumferential pegs are associated with the same spring, one for one circumferential direction and the other for the opposite circumferential direction, these elastic material pegs do not necessarily form part of a common core, but may instead be totally independent of one another.

In all cases, in the idle configuration of the damper, the free end of a peg may be in contact with corresponding circumferential edge of the opening in the driven part in which the spring concerned is disposed, as specifically disclosed hereinabove, or spaced from this edge.

In the latter case, there is a non-loaded movement of the coaxial parts concerned relative to one another before their entry into action.

This may be the case, for example, with elastic material pegs 30R.

In the situation where, in the idle configuration of the damper, the free end of an elastic material peg is in contact with the corresponding circumferential edge of the opening in the driven part in which the spring in question is disposed, the elastic material peg may be unstressed or prestressed.

Naturally enough, all possible combinations between the various elastic material pegs used may be employed.

Likewise, the respective functions of the coaxial parts concerned, referred to herein as the driving and driven parts for reasons of convenience only, may be interchanged between these parts.

Also, each elastic material peg can have, if required and at its free end at least, a thickness as measured parallel to the axis of the damper which is less than that of the hub disk, to prevent it being indented thereby.

Finally, the application of the invention is not limited to torsional damper devices comprising only two coaxial parts mounted rotatably relative to one another, but also covers cases where a torsional damper device of this kind comprises a greater number of coaxial parts mounted to rotate relative to one another in pairs.

It also covers the case where friction is developed to obtain a hysteresis effect.

The elastic material pegs in accordance with the invention develop such friction of their own accord, by virtue of the constricting means associated with them.

As a result, it is possible with advantage to dispense with any other means specific to producing this effect.

It is claimed:

1. A multi-stage torsional damper comprising at least two coaxial parts mounted so as to be rotatable relative to one another within pre-determined limits of relative angular movement, first and second torsional damping stages operatively disposed between said coaxial parts, said second stage torsional damping means comprising a plurality of helical springs extending in a substantially tangential direction relative to a circumference of the damper and disposed between said coaxial parts in the circumferential direction, each of said springs being partially housed, without circumferential clearance in a rest configuration of the damper, in an opening formed for this purpose in a first of said coaxial parts, and partially housed with circumferential clearance in said rest configuration, in an opening formed for this purpose in a second of said coaxial parts, said first stage torsional damping means comprising a peg of elastic material arranged inside at least one of said helical springs and housed in an associated opening in said second coaxial part and a bush coaxial with said spring accommodating said peg and being circumferentially slidable relative thereto; and constricting means disposed between said elastic material peg and said bush to impede movement of said peg within said bush and to return said peg to a substantially central rest position after such movement, said bush being held in engagement with said first coaxial part during an initial range of relative angular displacement of said coaxial parts while being slidable relative to said peg to effect first stage damping.

2. A torsional damper according to claim 1, wherein, in said rest configuration of the damper, said elastic material peg has a free end engageable with a corresponding circumferential edge of said opening in said second coaxial part in which the associated spring is disposed.

3. A torsional damper according to claim 1, wherein, in said rest configuration of the damper, said elastic material peg has a free end spaced from a corresponding circumferential edge of said opening in said second coaxial part in which the associated spring is disposed.

4. A torsional damper according to claim 1, comprising a respective peg of elastic material for each circumferential direction.

5. A torsional damper according to claim 1, wherein said bush is held in engagement with said first coaxial part during said initial range of relative angular displacement by means of the associated spring.

6. A torsional damper according to claim 5, wherein said bush has a flange disposed circumferentially between one end of the associated spring and the corresponding edge of said opening in said first coaxial part in which said spring is disposed.

7. A torsional damper according to claim 1, wherein said peg is operative in both circumferential directions.

8. A torsional damper according to claim 7, wherein said peg and said bush have complementarily shaped narrowed sections defining said constricting means.

9. A torsional damper according to claim 1, wherein the stiffness of said elastic material of said peg is significally less than that of the associated spring.

10. A torsional damper according to claim 1, wherein said elastic material peg has a tapered free end.

11. A torsional damper according to claim 1, wherein said springs are disposed in at least two groups with different values of circumferential clearance in their openings in said second part in said rest configuration, and a respective peg of elastic material is associated with only those of said springs having the lower or lowest value of circumferential clearance.

12. A torsional damper according to claim 1, wherein said peg extends circumferentially beyond the corresponding circumferential limit of said opening in said first coaxial part for the associated spring.

* * * * *